United States Patent [19]
Turner et al.

[11] Patent Number: 5,907,290
[45] Date of Patent: May 25, 1999

[54] IN-ROAD MICROWAVE VEHICLE STOPPER

[75] Inventors: Todd M. Turner, Laurel; Mark D. Berry, Columbia; Edward P. Scannell, Phoenix, all of Md.

[73] Assignee: The United States of America as represented by the Secretary of the Army, Washington, D.C.

[21] Appl. No.: 08/919,074

[22] Filed: Aug. 22, 1997

[51] Int. Cl.$^6$ ............................ G08C 19/00; B60R 25/00; B60T 7/16
[52] U.S. Cl. ................................ 340/825.57; 340/825.31; 340/825.69; 307/10.2; 180/167
[58] Field of Search .......................... 340/825.57, 825.31, 340/825.69, 825.06, 902, 904, 825.34; 180/167, 287; 307/10.1, 10.2, 10.3, 10.4, 10.5, 10.6

[56] References Cited

U.S. PATENT DOCUMENTS 5,293,527  3/1994  Sutton et al. ....................... 340/825.57

Primary Examiner—Michael Horabik
Assistant Examiner—Jean B. Jeanglaude
Attorney, Agent, or Firm—Paul S. Clohan, Jr.; Mark D. Kelly; William E. Eshelman

[57] ABSTRACT

A stationary microwave system for irradiating microwave frequency energy (0.200–40 GHz) at target vehicles disrupts the operation of the target vehicle's electronic engine control systems, rendering it incapable of fleeing law enforcement agents (LEAs). The system includes a microwave generation source; a triggering system to control pulsewidth, periodic frequency, duration, and time on; an interlock system for safety; and a delivery system for directing the microwave energy and irradiating the target vehicle. The parameters of the microwave energy are optimized by the system such that the radiated microwave energy has the characteristics required to disrupt the target vehicle.

1 Claim, 1 Drawing Sheet

IN-ROAD MICROWAVE VEHICLE STOPPER

BACKGROUND OF THE INVENTION

The present invention relates in general to the use of radiated microwave energy to remotely disable vehicles, and in particular, to the use of radiated microwave energy to interfere with the operation of electronic engine control systems, thereby causing a vehicle to stall when irradiated.

An advantage of using microwave energy is that a vehicle can be disabled without causing any harm to the vehicle operator. Microwave energy also has an advantage over lower frequency sources which produce EMP (electromagnetic pulse) or radio waves, in that microwave energy is more directional, thereby reducing the chance of interfering with vehicles other than the target vehicle.

Among others, law enforcement agencies (LEAs) and military police are interested in the invention. One area of particular interest to the LEAs is the protection of border crossings and public, Military or Federal facilities.

SUMMARY OF THE INVENTION

It is an object of the present invention to provide an apparatus for remotely disabling a vehicle's electrical system.

This and other objects of the invention are achieved by an apparatus for radiating microwave frequency energy into an underbody of a target vehicle and disrupting operation of the target vehicle's electronic control system, comprising a power source; a microwave producing device; a safety interlock between the power source and the microwave producing device; a pulse generator which controls the pulsewidth, pulse repetition frequency, and duration of irradiated waveforms; a power transporter; and a radiating antenna.

In one embodiment, the microwave producing device generates microwave energy in the range of 200 Megahertz to 40 Gigahertz, the pulse repetition frequency is in the range of single shot to 1,000 hertz and the pulsewidth is in the range of 0.5 to 20 microseconds.

Preferably, the apparatus has a duty factor in the range of 0.001 to continuous operation.

In another embodiment, the apparatus further comprises an array of radiating antennas which are mounted one of flush with or below a road surface.

Preferably, the apparatus further comprises a sensor for sensing when the target vehicle is over a radiating antenna and the array of radiating antennas are switched on and off so as to operate only as the target vehicle passes.

These and other objects, features and advantages of the invention will become apparent from the following detailed description taken in conjunction with the accompanying drawings.

BRIEF DESCRIPTION OF THE DRAWINGS

The FIGURE schematically shows a plan view of an embodiment of the invention.

DETAILED DESCRIPTION OF THE PREFERRED EMBODIMENTS

Figure 1:
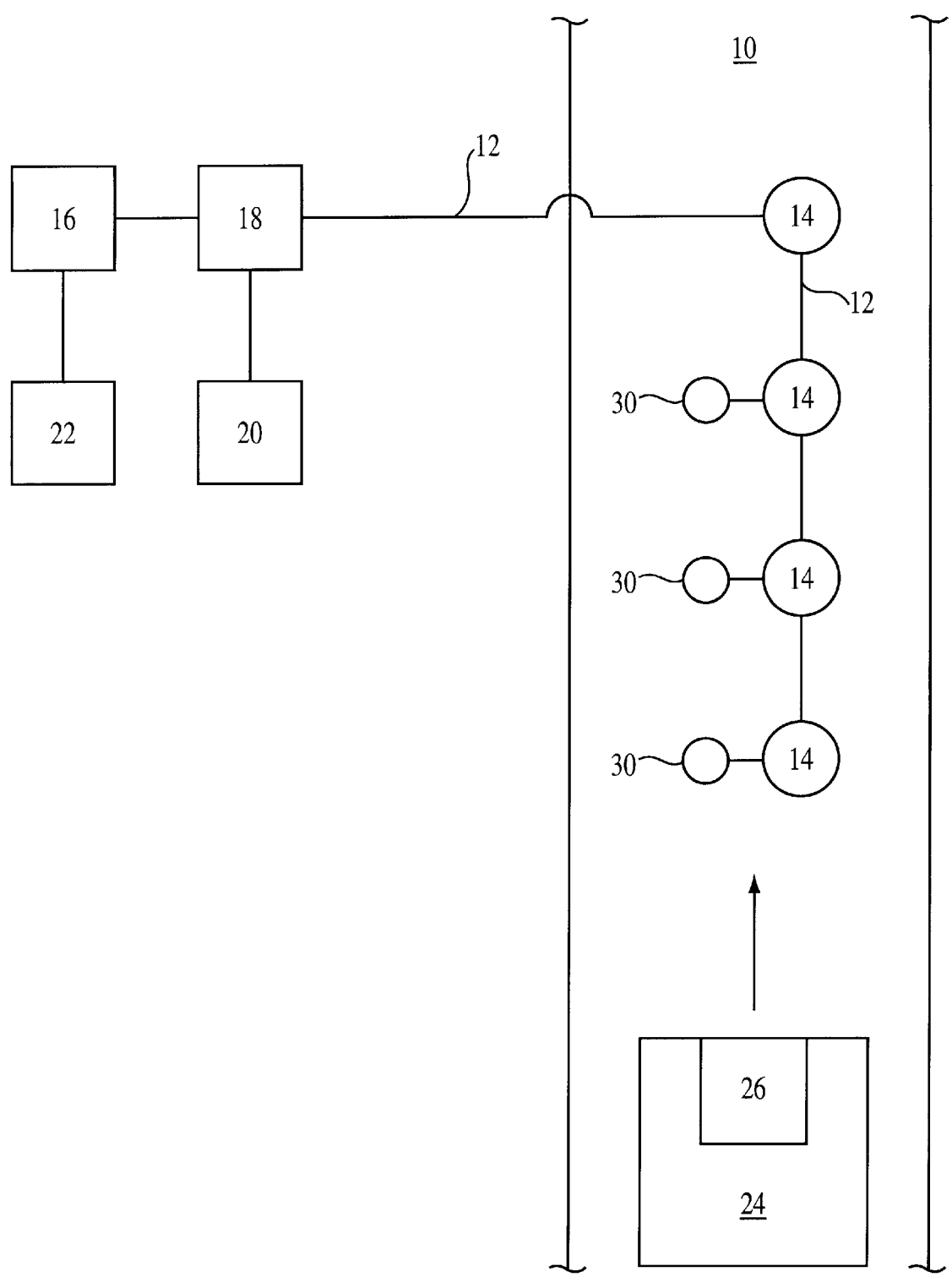

The invention is a stationary microwave system for irradiating microwave frequency energy at target vehicles to disrupt the operation of the target vehicle's electronic engine control systems, thereby rendering it incapable of fleeing, for example, law enforcement agents (LEAs). The microwave energy may have a frequency of 0.200–40 GHz, a pulsewidth of 0.5–20 us and a pulse repetition rate of single shot to 1 kilohertz. Preferably, the microwave energy has a frequency of 0.500–10 GHz, a pulsewidth of 1–10 us and a pulse repetition rate of single shot to 1 kilohertz. The exact parameters of the microwave source are dependent on the physical characteristics of the application scenario, and the availability of microwave producing devices for particular frequency ranges. The source should be designed such that it can be quickly swept across its frequency range.

The system includes a microwave generation source; a triggering system to control pulsewidth, periodic frequency, duration, and time on; an interlock system for safety; and a delivery system for directing the microwave energy and irradiating the target vehicle. The parameters of the microwave energy may be optimized by the system such that the radiated microwave energy has the characteristics required to disrupt the target vehicle.

The FIGURE schematically shows a plan view of an embodiment of the invention. The view of the roadway 10 is from above. The power transporter 12 (transmission line) and radiating antennas 14 may or may not be obvious from the road surface 10. The radiating antennas 14 may be of any shape and design required to efficiently radiate microwave energy.

One embodiment of the In-Road Microwave Vehicle Stopper is comprised of six basic components:

1) A source 16 of prime power, which is used to condition the high voltage (the voltage is dependent on the source chosen) necessary to drive the microwave producing device 18. The power source 16 may be interlocked to prevent unintended firing of the system.
2) A pulse generator 20 which controls the pulsewidth, pulse repetition frequency, duration and timing of the microwave radiation.
3) A safety interlock 22 to ensure against unintended arming and firing of the system.
4) A microwave producing device 18, for example, a magnetron, which produces the microwave energy at the required frequency and power levels for disabling the electronic engine control system 26 of the target vehicle 24.
5) A delivery component or power transporter 12 to transport the microwave energy from the microwave producing device 18 to the radiating antenna(s) 14.
6) A radiating antenna(s) component 14 for aiming the radiated power at the target vehicle 24.

The radiating antenna component 14 may be any device which irradiates directed microwave energy into the underbody of the target vehicle 24, such as waveguide horns, open ended waveguide, leaky radiators, stripline, or patch antennas.

The radiating antennas 14 may be installed at predetermined spacings along approximately 300 yards of road surface 10 and radiate upwards into the underbody of a passing vehicle 24. Each antenna 14 would be capable of being switched to radiate only when the target car 24 was passing over. By timing the antenna to radiate only when the target car is passing, interference with other vehicles in the vicinity of the target car will be minimized.

Timing may be accomplished, for example, by using sensors 30 (light or infrared) to determine when the target 24 vehicle is over a particular antenna 14. The sensor 30 causes the shutter of the antenna directly under the vehicle to be opened, while the remaining antennas are closed. The shutter or switch of the closed antennas creates a short resulting in an open at the transmission line and does not attenuate the signal to the later antennas.

Radiating directly into the underbody reduces the exposure levels of the vehicle operator. The device is operable by one trained individual and is equipped with a safety interlock 22 to prohibit unintended firing. The interlock 22 could be hand held, or built into the road surface 10, depending on application requirements.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for radiating microwave frequency energy into an underbody of a target vehicle and disrupting operation of the target vehicle's electronic control system, comprising:

a power source;

a microwave producing device;

a safety interlock between the power source and the microwave producing device;

a pulse generator which controls the pulsewidth, pulse repetition frequency, and duration of irradiated waveforms;

a power transporter;

an array of radiating antennas mounted either flush with or below a road surface;

a sensor for sensing when the target vehicle is over a radiating antenna; and a switch responsive to the sensor for selectively and sequentially connecting an antenna of the array to the microwave producing device when the target vehicle passes over the antenna to minimize exposure to microwave energy of nontarget vehicles and to radiate microwave energy directly into the underbody of a target vehicle to achieve greater exposure of moving target vehicles to the irradiated waveforms;

wherein the microwave producing device generates pulses in a frequency range of 500 Megahertz to 10 Gigahertz which are swept across the frequency range to maximize signal power spectral density;

wherein the pulse repetition frequency is in the range of a single shot to 1,000 hertz;

wherein the apparatus has a duty factor in the range of 0.001 to continuous operation;

wherein the pulsewidth is in the range of 1–10 microseconds.

* * * * *